United States Patent
Shetty et al.

(10) Patent No.: US 12,218,923 B1
(45) Date of Patent: Feb. 4, 2025

(54) SECURITY PROTOCOL HANDSHAKE OFFLOADING

(71) Applicant: Amazon Technologies, Inc., Seattle, WA (US)

(72) Inventors: Neha Shetty, Bothell, WA (US); Steven Collison, Seattle, WA (US); Andrew Hourselt, Seattle, WA (US); James Christopher Sorenson, III, Seattle, WA (US); Douglas Stewart Laurence, Redmond, WA (US); Colm MacCárthaigh, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 537 days.

(21) Appl. No.: 17/547,909

(22) Filed: Dec. 10, 2021

(51) Int. Cl.
*H04L 9/40* (2022.01)
*G06F 21/60* (2013.01)

(52) U.S. Cl.
CPC ........ *H04L 63/0485* (2013.01); *G06F 21/602* (2013.01); *H04L 63/123* (2013.01); *H04L 63/166* (2013.01); *H04L 63/20* (2013.01)

(58) Field of Classification Search
CPC . H04L 63/0485; H04L 63/123; H04L 63/166; H04L 63/20; G06F 21/602
See application file for complete search history.

(56) References Cited

U.S. PATENT DOCUMENTS

| | | | |
|---|---|---|---|
| 7,441,119 B2 | 10/2008 | Brabson et al. | |
| 8,041,940 B1 | 10/2011 | Natanzon et al. | |
| 9,195,851 B1 | 11/2015 | Chandra | |
| 9,712,503 B1 | 7/2017 | Ahmed | |
| 10,348,687 B2 * | 7/2019 | Taylor | H04L 63/101 |
| 10,979,493 B1 * | 4/2021 | Farrugia | H04L 47/125 |
| 2003/0046585 A1 | 3/2003 | Minnick | |
| 2003/0105952 A1 * | 6/2003 | Brabson | H04L 63/166 726/1 |
| 2007/0101023 A1 | 5/2007 | Chhabra et al. | |
| 2008/0022094 A1 | 1/2008 | Gupta et al. | |
| 2008/0022124 A1 | 1/2008 | Zimmer et al. | |
| 2008/0267177 A1 | 10/2008 | Johnson et al. | |
| 2010/0228962 A1 | 9/2010 | Simon et al. | |

(Continued)

FOREIGN PATENT DOCUMENTS

KR   20200061286 A   *   6/2020   .........   H04L 67/2861

OTHER PUBLICATIONS

Barnes, et al., "Delegated Credentials for TLS draft-ietf-tls-subcerts-11," Network Working Group, Internet—Draft. Sep. 2021, pp. 1-20.
U.S. Appl. No. 16/285,086.

(Continued)

*Primary Examiner* — Michael R Vaughan
(74) *Attorney, Agent, or Firm* — S. Scott Foster; Kowert, Hood, Munyon, Rankin & Goetzel, P.C.

(57) ABSTRACT

Contents of client-initiated handshake messages of a security protocol are obtained at a handshake processing offloader configured for an application. The offloader uses a first security artifact (which is inaccessible from a front-end request processor of the application) and the contents of the handshake messages to generate a second security artifact. The second security artifact is transmitted to the front-end request processor, which uses it to perform cryptographic operations for client-server interactions of the application.

20 Claims, 10 Drawing Sheets

(56) References Cited

U.S. PATENT DOCUMENTS

| | | |
|---|---|---|
| 2016/0373414 A1 | 12/2016 | MacCarthaigh |
| 2017/0317991 A1 | 11/2017 | Lionetti |
| 2018/0004954 A1 | 1/2018 | Liguori |
| 2019/0124054 A1 | 4/2019 | Zhang |
| 2021/0160236 A1* | 5/2021 | Ray .................... H04L 63/0815 |
| 2022/0029820 A1* | 1/2022 | Mozano ................ H04L 9/0891 |
| 2022/0345298 A1* | 10/2022 | Cap ...................... H04L 9/0869 |

OTHER PUBLICATIONS

U.S. Appl. No. 16/2585,086, filed Feb. 25, 2019, Atul Khare, et al.

* cited by examiner

Handshake offloading implementation options 601

Login and shell access to offloaders prohibited 610

Private keys stored in encrypted form at rest 620 (e.g., on disk)

During offloader configuration, data encryption keys (DEKs) obtained from key management service (KMS) are used to encrypt/decrypt transmitted private keys, and DEKs are rotated frequently 630

Minimized machine images used for offloaders 640

Offloader processes run in restricted execution environment (e.g., using chroot) 650

Special dedicated networking hardware links and devices used for communication between offloaders and front-end request processors 660

Encapsulation protocol (which may itself use a security protocol similar to TLS) used for transmitting handshake messages to/from offloaders 670

SECURITY PROTOCOL HANDSHAKE OFFLOADING

BACKGROUND

Modern applications and services typically support security protocols such as Transport Layer Security (TLS) for safeguarding client-server communications using authentication, privacy and data encryption algorithms. An interaction session between a client and a server begins with a handshake procedure, during which the two sides exchange a sequence of messages defined by the protocol to determine the security algorithms and parameters to be used for the remainder of the session. In a TLS handshake, for example, a certificate which includes a public/private key pair is provided by the server to the client and used by the client to verify that the client has connected to an expected trusted party. For applications which are accessed by clients via front-end request processors such as web servers or load balancers, the certificates or other analogous security artifacts may sometimes be stored at the front-end request processors. Especially in scenarios in which large fleets of such front-end request processors are used, managing the distribution and lifecycles of the security artifacts can also pose a challenge.

BRIEF DESCRIPTION OF DRAWINGS

FIG. 6 illustrates example implementation options of a handshake offloading solution, according to at least some embodiments.

Figure 1:
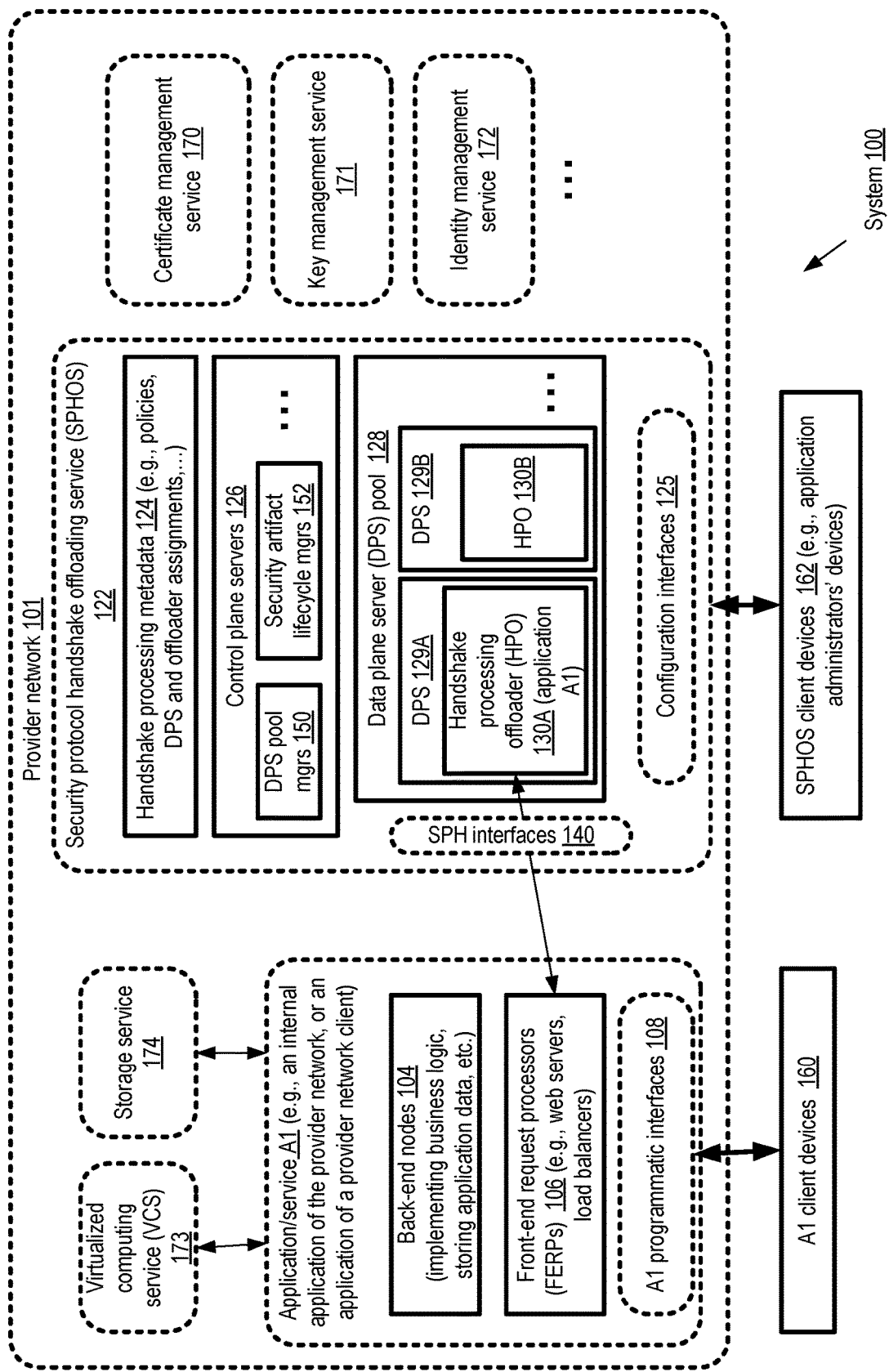
FIG. 1 illustrates an example system environment in which a handshake offloading service of a cloud provider network may be employed to enhance the manageability of artifacts which are utilized during client-server session establishment for a variety of applications, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof. Unless otherwise explicitly stated, articles such as "a" or "an" should generally be interpreted to include one or more described items throughout this application. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

DETAILED DESCRIPTION

The present disclosure relates to methods and apparatus for offloading the processing of security protocol handshake messages from front-end request processors of an application or service, which can be implemented using resources of a cloud computing environment, to a handshake offloading service implemented at the cloud computing environment. The handshake offloading service can include a pool of servers at each of which one or more instances of handshake offloaders can be instantiated. A given handshake offloader can include one or more processes or threads of execution which can perform server-side operations of the handshake procedure for client-server session establishment according to at least one security protocol, such as a version of the Transport Layer Security (TLS) protocol. An offloader in effect acts as a temporary substitute for a front-end request processor (FERP) of an application or service, such as a web server or a load balancer, during the handshake procedure of a client-server interaction session in which the server side of the application or service authenticates itself to the client.

As part of the handshake procedure, sensitive security artifacts such as a private key of an asymmetric key pair of a TLS server certificate of the application are used by the offloader to perform various computations. A given security artifact used during the handshake can typically remain valid for a long period, such as months or years. After the handshake procedure is completed successfully with a given client, the offloader transfers additional security artifacts (e.g., a so-called master secret in the case of a TLS session, which cannot be re-used across sessions) generated during the successful handshake to the FERP, and the offloader takes no further part in the session. The additional security artifacts generated during the handshake can be used by the FERP to secure subsequent application traffic, e.g., by generating additional cryptographic artifacts such as data encryption keys that can be used to encrypt/decrypt service requests and responses.

The handshake offloading service can also perform a number of administrative tasks for the application, such as automatically renewing TLS server certificates or other artifacts as needed, implementing security policies (which can for example indicate the particular ciphers or other algorithms to be used for some subset of end users of the application) specified by administrators of the applications, automatically scaling up (or down) the number of offloaders designated for an application, ensuring high availability and fault resilience of the offloaders and so on. Note that a given application can in some cases utilize more than one TLS server certificate (e.g., one certificate per network endpoint configured for accessing the application), which makes creating, distributing, renewing/rotating and otherwise managing private keys even more burdensome than if a single TLS certificate were used; the handshake offloading service is even more beneficial for administering such multi-certificate applications. In contrast to schemes in which the TLS certificates have to be propagated to all the FERPs of an application, the offloading approach only requires the TLS certificates to be made accessible from a (typically) small number of offloaders, so work that would otherwise have to be performed to coordinate and to some extent synchronize the distribution of the TLS certificates to all the FERPs can be avoided. The terms "application" and "service", as used herein, each refer to an entity that receives requests for operations via a network from a set of client or end-user devices, and performs the requested operations at one or more servers after verifying various properties of the requests.

As one skilled in the art will appreciate in light of this disclosure, certain embodiments may be capable of achieving various advantages, including some or all of the following: (a) reducing the overall amount of network, computing, and/or storage resources which have to be used for propagating, storing, renewing and managing security artifacts such as TLS certificates of large-scale application deployments, and/or (b) enhancing the user experience of administrators of applications and services utilizing security protocols such as TLS, e.g., by reducing the need to respond to problem scenarios in which security artifacts at some front-end request processors have expired while the artifacts at other front-end request processors remain valid, by enabling and simplifying the implementation of administrator-specified policies at various granularities (such as client IP address range granularity), and so on.

According to some embodiments, a system may comprise one or more control plane servers (CPSs) of a security protocol handshake offloading service (SPHOS) of a cloud provider network, a handshake processing offloader (HPO), and a set of front-end request processors (FERPs) of an application. The HPO may be implemented at least in part at a data plane server (DPS) of a pool of DPSs of the SPHOS, and may include logic used to implement at least a portion of a handshake procedure of a security protocol employed for client-server interactions by the application. Individual ones of CPSs, DPSs, and FERPs may comprise some combination of software (executable instructions) and hardware (including processors at which the software can be executed) of one or more computing devices in various embodiments. A CPS may, in response to one or more programmatic requests (e.g., from an administrator or owner of the application), store an indication that the front-end request processor is associated with, and permitted to communicate with, the handshake processing offloader (HPO) in various embodiments. Furthermore, the CPS may cause a first security artifact associated with the application to be stored at a location which is inaccessible from the FERP in some embodiments. A particular DPS may be selected by the CPS to implement at least a portion of the functionality of HPO which is assigned to the FERP, and one or more processes or threads implementing the HPO may be executed at that DPS.

At least a portion of contents of a set of client-initiated handshake messages of the security protocol may be obtained by the HPO at the DPS in some embodiments. As part of offloaded handshake processing of the protocol performed by the HPO, a second security artifact may be generated using the contents of the client-initiated handshake messages and the first security artifact (for example, the first security artifact may be used to encrypt/decrypt the contents of the messages). The second security artifact, whose validity period or expected lifetime may in some cases be considerably shorter than the validity period or expected lifetime of the first security artifact, may be transferred from the HPO to the FERP in various embodiments. After obtaining the second security artifact, the FERP may utilize it to perform at least some cryptographic operations with respect to a client-server interaction of the application. For example, the second security artifact may be used to generate encryption keys that can then be used to encrypt/decrypt subsequent client-server messages, the second security artifact may be directly used for encryption/decryption of client-server messages, and so on.

Any of a variety of security protocols in which such handshakes are employed for session initiation or establishment may be supported at an SPHOS in different embodiments. For example, versions 1.2 and/or 1.3 of the Transport Layer Security (TLS) protocol may be supported in one embodiment, enhanced variants/extensions of the Secure Sockets Layer (SSL) protocol may be used, custom security protocols may be supported, and so on. In one embodiment a given HPO may support more than one version of a security protocol, and/or versions of several different protocols. In the case of TLS, the first security artifact may comprise a private key of a TLS server certificate, while the second security artifact derived using the contents of the client-initiated handshake messages may comprise a TLS master secret and/or session-specific keys.

According to at least some embodiments, the SPHOS may simplify the definition and implementation of security policies pertaining to the security protocol. The SPHOS may implement programmatic interfaces which can be used by application owners or administrators (clients of the SPHOS) to specify security policies governing such aspects of the client-server interactions of an application as (a) an acceptable key exchange algorithm, (b) an acceptable authentication algorithm, (c) an acceptable data encryption algorithm, (d) an acceptable message authentication code (MAC) algorithm, or (e) an acceptable compression algorithm. As part of the handshake procedure, an HPO may ensure or verify that the policy applicable to a particular client is not violated by the client-initiated handshake messages from that client in some embodiments. Security policies may be specified at a variety of granularities via applicability rules in different embodiments, such as (a) a rule associated with the first security artifact (that is, the security policy is to be applied to any application client for which the first security artifact is used during the handshake), (b) a rule associated with a set of one or more client network addresses (that is, the security policy is to be applied to any application client whose requests originate from one of the addresses), (c) a rule associated with a client's physical location (which can sometimes be inferred from the network addresses), or (d) a rule associated with one or more domain names to which the client's requests are directed. As part of the handshake processing performed by the HPO, a security policy may be applied at a granularity in accordance with the applicability rule indicated earlier for the policy via the SPHOS programmatic interfaces in various embodiments.

In at least some embodiments, the client-initiated handshake messages may first be received at an FERP of the application, and then forwarded from the FERP to the HPO associated with the FERP. In one embodiment, an encapsulation protocol (different from the baseline security protocol used by the client to transmit the handshake messages to the FERP) may be used to transmit contents of the client-initiated handshake messages to the HPO. In some implementations, a dedicated private hardware network link, channel, or pathway may be used to connect the FERP to the HPO. In some embodiments, a smart routing intermediary device (e.g., a device of a packet processing service utilized in a cloud provider network at which the FERP and the SPHOS are implemented) may transfer the contents of client-initiated handshake messages to the HPO instead of the FERP. In at least some embodiments, communications between the FERP and the HPO may be encrypted (e.g., using another session of TLS or a similar protocol) independently of the encryption of the client-server messages of the application being secured using the HPO. In some embodiments, an HPO may comprise or be executed at a virtual machine or compute instance of a virtualized computing service of a provider network, and a special-purpose machine image may be used for the virtual machine. Subcomponents of an operating system which are not required for handshake message processing may be stripped or removed from the machine image. Multiple redundant instances of a given HPO may be set up using respective servers in different availability zones of the cloud provider network (more information about availability zones is provided below). In such a scenario, if an HPO in one of the availability zones fails or becomes inaccessible, some or all of the functionality of that HPO may instead be failed over to a redundant instance in another availability zone, so that the HPO functionality remains available despite the failure.

The SPHOS may help with various aspects of security artifact administration in some embodiments. For example, TLS certificates may need to be renewed periodically, and the SPHOS may automatically extend the validity periods of the certificates (e.g., by communicating with a certificate management service) without receiving explicit certificate renewal/extension requests from the administrators of the applications for which the certificates are being used. For some applications or services that require multiple certificates, e.g., one for each of several domain names of the application or service, the SPHOS may facilitate the acquisition as well as renewal/extension of the certificates. When new or updated certificates have to be propagated for a given application or service, the rollout of the certificates to the HPOs may be orchestrated by the SPHOS in some embodiments. A number of offloading-related metrics may be collected from the HPOs and made available via programmatic interfaces of the SPHOS to application administrators and other authorized users. Such metrics may, for example, include the number of handshakes processed at an HPO during a time interval, the number of times non-default security policies are applied for a client-server session, the relative frequencies of use of different security algorithms based on the policies, the number of artifact renewals which are performed per unit time, and so on.

In some embodiments, a given HPO may be configured in multi-tenant mode, e.g., by default. As a result, client-initiated handshake messages of various applications may be processed at the multi-tenant HPO. An SPHOS client such as an application administrator may submit a programmatic request for a single-tenant mode HPO in some embodiments, in which case a given HPO assigned to the application may only be used for that application. A given HPO may be associated with multiple FERPs of a given application in some embodiments. In some embodiments, a given FERP may be associated with multiple HPO instances—e.g., for higher availability and resiliency to failures, multiple redundant HPO instances may be set up for a given set of FERPs. In at least one embodiment, HPOs may be set up in single-tenant mode by default, and only used for a single application.

As mentioned above, in at least some embodiments an SPHOS may be implemented as one of a suite of services of a provider network or cloud computing environment. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet or a cellular communication network) and the hardware and software in cloud provider data centers that provide those services.

A cloud provider network can be formed as a number of regions, where a region is a separate geographical area in which the cloud provider clusters data centers. Such a region may also be referred to as a provider network-defined region, as its boundaries may not necessarily coincide with those of countries, states, etc. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g., via a VPN or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

The cloud provider network may implement various computing resources or network-accessible services, which may include, in addition to an SPHOS, a virtualized compute service (VCS), data processing service(s) (e.g., map reduce, data flow, and/or other large scale data processing techniques), data storage services (e.g., object storage services, block-based storage services, or data warehouse storage services), network function virtualization services or packet processing services, and/or any other type of network based services (which may include various other types of storage, processing, analysis, communication, event handling, visualization, and security services). The resources required to support the operations of such services (e.g., compute and storage resources) may be provisioned in an account associated with the cloud provider, in contrast to resources requested by users of the cloud provider network, which may be provisioned in user accounts.

Various network-accessible services may be implemented at one or more data centers of the provider network in different embodiments. Network-accessible computing services can include an elastic compute cloud service (referred to in various implementations as an elastic compute service, a virtual machines service, a computing cloud service, a compute engine, or a cloud compute service). This service may offer compute instances (also referred to as virtual machines, or simply "instances") with varying computational and/or memory resources, which are managed by a compute virtualization service (referred to in various implementations as an elastic compute service, a virtual machines service, a computing cloud service, a compute engine, or a cloud compute service). In one embodiment, each of the virtual compute instances may correspond to one of several instance types or families. An instance type may be characterized by its hardware type, computational resources (e.g., number, type, and configuration of virtualized central processing units (VCPUs or VCPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics (such as a "burstable" instance type that has a baseline performance guarantee and the ability to periodically burst above that baseline, or a non-burstable or dedicated instance type that is allotted and guaranteed a fixed quantity of resources). Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. A suitable host for the requested instance type can be selected based at least partly on factors such as collected network performance metrics, resource utilization levels at different available hosts, and so on. The applications or services whose client-server interactions are secured with the help of an SPHOS may themselves be implemented using resources (such as compute instances, storage servers etc.) of other services of the provider network in some cases. The resource pools used at an SPHOS for implementing handshake processing offloaders may comprise compute instances in at least some embodiments. In one embodiment, the SPHOS may be used by other services of the provider network (e.g., an intermediary service which enables access to a storage service via private internal pathways of the provider network) to process handshakes during session establishment of clients or end users of the other services.

The computing services of a provider network can also include a container orchestration and management service (referred to in various implementations as a container service, cloud container service, container engine, or container cloud service). A container represents a logical packaging of a software application that abstracts the application from the computing environment in which the application is executed. For example, a containerized version of a software application includes the software code and any dependencies used by the code such that the application can be executed consistently on any infrastructure hosting a suitable container engine (e.g., the Docker® or Kubernetes® container engine). Compared to virtual machines (VMs), which emulate an entire computer system, containers virtualize at the operating system level and thus typically represent a more lightweight package for running an application on a host computing system. Existing software applications can be "containerized" by packaging the software application in an appropriate manner and generating other artifacts (e.g., a container image, container file, or other configurations) used to enable the application to run in a container engine. A container engine can run on a virtual machine instance in some implementations, with the virtual machine instance selected based at least partly on the described network performance metrics. Other types of network-accessible services, such as packet processing services, database services, wide area networking (WAN) services and the like may also be implemented at the cloud provider network in some embodiments.

The traffic and operations of the cloud provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, or system state information). The data plane includes customer resources that are implemented on the cloud provider network (e.g., computing instances, containers, block storage volumes, databases, or file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

FIG. 1 illustrates an example system environment in which a handshake offloading service of a cloud provider network may be employed to enhance the manageability of artifacts which are utilized during client-server session establishment for a variety of applications, according to at least some embodiments. As shown, system 100 includes resources and artifacts of a security protocol handshake offloading service (SPHOS) 122 at which a number of handshake processing offloaders (HPOs) may be configured to perform at least a subset of handshake operations on behalf of one or more application/services including application/service A1. In the scenario depicted in FIG. 1, Application A1 may include a set of back-end nodes 104 at which the business logic of A1 may be implemented, and/or application data of A1 may be stored. Application A1 may also include a set of front-end request processors (FERPs) 106, such as some number of web servers, load balancers and the like. End users or clients of application A1 may submit requests for A1 operations from a set of A1 client devices 160 (e.g., laptops, desktops, mobile computing devices, virtual machines or compute instances, and the like) during client-server interaction sessions via A1 programmatic interfaces 108 to the FERPs 106, and the FERPs may in turn pass on internal versions of the requests to the back-end nodes 104 for implementation. An application A1 may be an internal application or service developed and deployed by the operator of provider network 101 in some cases (e.g., a storage or a database service, as discussed below in the context of FIG. 9); in other cases, A1 may be implemented by a client or customer of the provider network. Provider network 101 may comprise a number of network-accessible services in addition to SPHOS 122 in the depicted embodiment, such as a virtualized computing service (VCS) 173, a storage service 174, a certificate management service 170, a key management service 171 and an identity management service 172. Key management service 171 may comprise hardware security modules in the depicted embodiment, which may be used by applications such as A1, and/or by provider network services including the SPHOS, to create cryptographic keys used during various stages of the operations of the applications or services. Certificate management service 170 may allow its clients (such as administrators of applications like A1) to easily provision and deploy public and/or private TLS or SSL (Secure Sockets Layer) certificates in the depicted embodiment. Application A1 may be built using components of the VCS 173 and/or storage service 174 in some embodiments—e.g., compute instances of the VCS may be used as FERPs and/or back-end nodes, application data may be stored at storage service 174, and so on.

Application A1 may utilize a security protocol such as TLS for securing communications between A1's clients and the resources used to implement A1 in various embodiments. Security artifacts for A1, such as TLS certificates, may be acquired by an owner or administrator of A1 from the certificate management service 170 in the depicted embodiment. End users or clients of A1 may be granted permissions to utilize various subsets of features or functions of A1 via rules, roles and/or capabilities defined at identity management service 172 in some embodiment. In at least some embodiments, assignments of FREPs to HPOs may be managed using roles defined at the identity management service—e.g., during configuration of an HPO for an application, the application administrator could indicate that an FREP assigned a role R1 is to be allowed to communicate with the HPO.

SPHOS 122 may comprise a set of control plane servers 126, as well as a data plane server (DPS) pool 128 in the depicted embodiment. Control plane servers 126 may include, for example, DPS pool managers 150 and security artifact lifecycle managers 152. The DPS pool managers 150 may initially configure some number of data plane servers (DPSs), such as DPS 129A and DPS 129B of pool 128. The DPS pool managers may collect and monitor metrics (such as resource utilization measures) of the DPSs to determine if and when new DPSs should be launched or existing DPSs should be taken offline; that is, pool 128 may be scaled up or down automatically as needed based on the amount of handshake processing needed for the applications/service using the SPHOS. At a given DPS, zero or more handshake processing offloaders (HPOs) 130, such as HPO 130A or 130B, may be executed at a given point in time. For example, HPO 130A may be assigned to implement TLS handshake operations for one or more FERPs 106 of application A1. A given HPO 130 may comprise one or more processes or threads of execution in some embodiments. Some data plane servers or HPOs 130 may be configured in multi-tenant mode, in which the same DPS or the same HPO may be used for processing handshakes of several different applications. Other DPSs or HPOs may be configured in single-tenant mode, in which case handshakes of only a single application may be processed at a DPS or an HPO. The SPHOS may implement configuration interfaces 125 in the depicted embodiment, which can be used by SPHOS clients (such as administrators of applications like A1) to request assignment of HPOs in a preferred tenancy mode or the default tenancy mode used at the SPHOS, specify security policies, obtain offloading-related metrics and so on. SPHOS configuration interfaces 125 as well as A1 programmatic interfaces 108 may each include, for example, web-based consoles, command-line tools, application programming interfaces (APIs), graphical user interfaces and the like.

Requests or messages submitted via the configuration interfaces from SPHOS client devices 162 (e.g., laptops, desktops, mobile computing devices and the like which may be used by administrators of applications such as A1) may be processed at control plane servers 126 in various embodiments. The control plane servers 126 may store a variety of metadata 124 pertaining to handshake processing, such as security policies specified by SPHOS clients, DPS and offloader assignments (e.g., the specific applications and FERPs to which a given HPO or a given DPS is assigned currently), and so on in the depicted embodiment. Security artifact lifecycle managers 152 may store information such as expiration dates of TLS certificates and/or other security artifacts being managed at the SPHOS in the depicted embodiment, and use the expiration information to automatically schedule renewals or extensions in a timely manner for the artifacts without requiring application administrators to request the renewals/extensions. For example, a security artifact lifecycle manager 152 may communicate with certificate management service 170 to cause TLS certificates to be renewed or updated as needed.

According to at least one embodiment, in response to one or more programmatic requests received via SPHOS configuration interfaces, a control plane server 126 of the SPHOS may store metadata indicating an association between an FERP 106 and an HPO 130 (e.g., 130A) configured to perform server-side handshake operations of the security protocol (e.g., TLS version 1.2 or TLS version 1.3) being used by application A1 for client-server interactions. The metadata may in effect indicate the FERP(s) that are permitted to communicate with the HPO. Note that in some embodiments, multiple HPOs (which may also be referred to as HPO instances) may be configured for a single application such as A1, and a respective subset of the FERPs of the application may be permitted to communicate with a given HPO. Multiple HPOs may also be configured for a given application for availability and fault resiliency reasons in some embodiments. For example, at least one HPO may be configured within each of several availability zones, such that in the event of a failure which makes communication with an HPO in one of the availability zones infeasible temporarily, operations of the inaccessible HPO may be failed over to an HPO in a different availability zone. That is, the server-side handshake operations which would normally have been performed at an HPO H1 in availability zone AZ1 for a client-server interaction session with a particular client may instead be performed at a different HPO H1 in availability zone AZ2. Note that at least in some embodiments, redundant instances of FERPs and/or back-end nodes of an application may also be set up in respective availability zones to enhance application resiliency.

In at least one embodiment, in response to one or more programmatic requests, a control plane server may cause a first security artifact (such as a TLS certificate) associated with A1 to be stored at a location which is inaccessible from the FERPs of the application. For example, an A1 administrator may submit a request to the certificate management service 170 to obtain/generate the TLS certificate and provide the certificate to the SPHOS, where the certificate may be stored (e.g., in encrypted form, using a key obtained from the key management service) at a storage device inaccessible from outside the SPHOS. In addition to storing certificates in encrypted form at rest, the SPHOS may also ensure in some embodiments that the certificate is transmitted in encrypted form from the certificate management service, and/or when the certificate is in transit between the SPHOS control plane and the SPHOS data plane.

The HPO 130 assigned to A1 may obtain at least a portion of contents of a set of client-initiated handshake messages of the security protocol used for A1 in the depicted embodiment. A second security artifact (such as a TLS master secret) may be generated at the HPO during the server-side handshake operations performed by the HPO, e.g., using the contents of the client-initiated handshake messages and the first security artifact. In embodiments in which the first security artifact is stored in encrypted form at a location accessible from the HPO, or transmitted in encrypted form to the HPO, the HPO may decrypt the first security artifact before using it to generate the second security artifact. In at least some embodiments, the validity period of the second security artifact (which may be limited to the duration of a single client-server interaction session) may be shorted than the validity period of the first security artifact (which may be months or years). The second security artifact may be sent to one or more FERPs from the HPO 130 in some embodiments. At the FRP, the second security artifact may be utilized, during its validity period, to perform one or more cryptographic operations with respect to a client-server interaction of A1. For example, a symmetric encryption key derived using the second security artifact may be employed to encrypt/decrypt further messages exchanged by the FERP with the A1 client whose handshake messages were processed to generate the second security artifact. Requests from the A1 client for various operations/functions of A1 may be decrypted at an FERP and passed on to a back-end node 104 for implementation, and responses generated at the back-end node may be encrypted at the FERP prior to transmission to the A1 client in various embodiments.

In at least some embodiments, the client-initiated handshake messages may be received at an FERP, and then relayed or transmitted (at least in part) to the HPO from the FERP, e.g., via SPH interfaces 140. In one embodiment, a different protocol (e.g., an encapsulation protocol defined by the provider network) may be used to transmit the handshake messages from the FERPs to the HPOs than is used for the transmission of the handshake messages from the application's client devices to the FERPs. In various embodiments, even though some of the client-initiated handshake messages may be received in plain text form at an FERP, an encrypted version of the messages may be passed on to the HPO from the FERP. In some implementations, special dedicated hardware links or channels which are physically secured (e.g., located in data center rooms that are not accessible even to most employees of the provider network) may be used for communication between the FERPs and the HPOs. In some embodiments, special stripped-down versions of machine images, from which operating system components that are not needed for handshake processing have been removed, may be used to launch virtual machines comprising the HPOs. In at least one embodiment, an HPO may comprise a process or thread run in an isolation mode in which the process or thread is not permitted to access a resource (e.g., a set of directories or folders at a data plane server) that is accessible from other HPOs. A variety of offloading-related metrics may be collected by control plane servers of the SPHOS in different embodiments, and provided to SPHOS clients upon request. Such metrics may include, among others, the number of handshakes processed for an application during a given time interval, the number of times a client-specified policy was applied, and so on.

An SPHOS client such as an administrator of an application may submit security policies to be applied for client-server interactions of the application via configuration interfaces 125 in some embodiments. The policy may indicate various desired properties of the client-server interactions, such as (but not limited to) (a) an acceptable key exchange algorithm, (b) an acceptable authentication algorithm, (c) an acceptable data encryption algorithm, (d) an acceptable message authentication code (MAC) algorithm, or (e) an acceptable compression algorithm. The HPOs assigned to the application may apply or enforce the policies, e.g., by verifying (during analysis of the client-initiated handshake messages) that clients interacting with the application are in compliance with the policy and do not violate the policy. Policies may be specified at (and enforced at) any of several different granularities or applicability levels in different embodiments. For example, an SPHOS client may specify an applicability rule of a policy, and the rule may be a member of a set comprising one or more of: (a) a rule associated with a TLS certificate, (b) a rule associated with a specified set of client addresses, (c) a rule associated with a client location, or (d) a rule associated with one or more domain names. The HPOs assigned to the application may use the applicability rule to determine whether the policy applies to any given client-server interaction of the application in different embodiments, and verify that the client-server interaction is compliant in accordance with the applicability rule.

Figure 2:
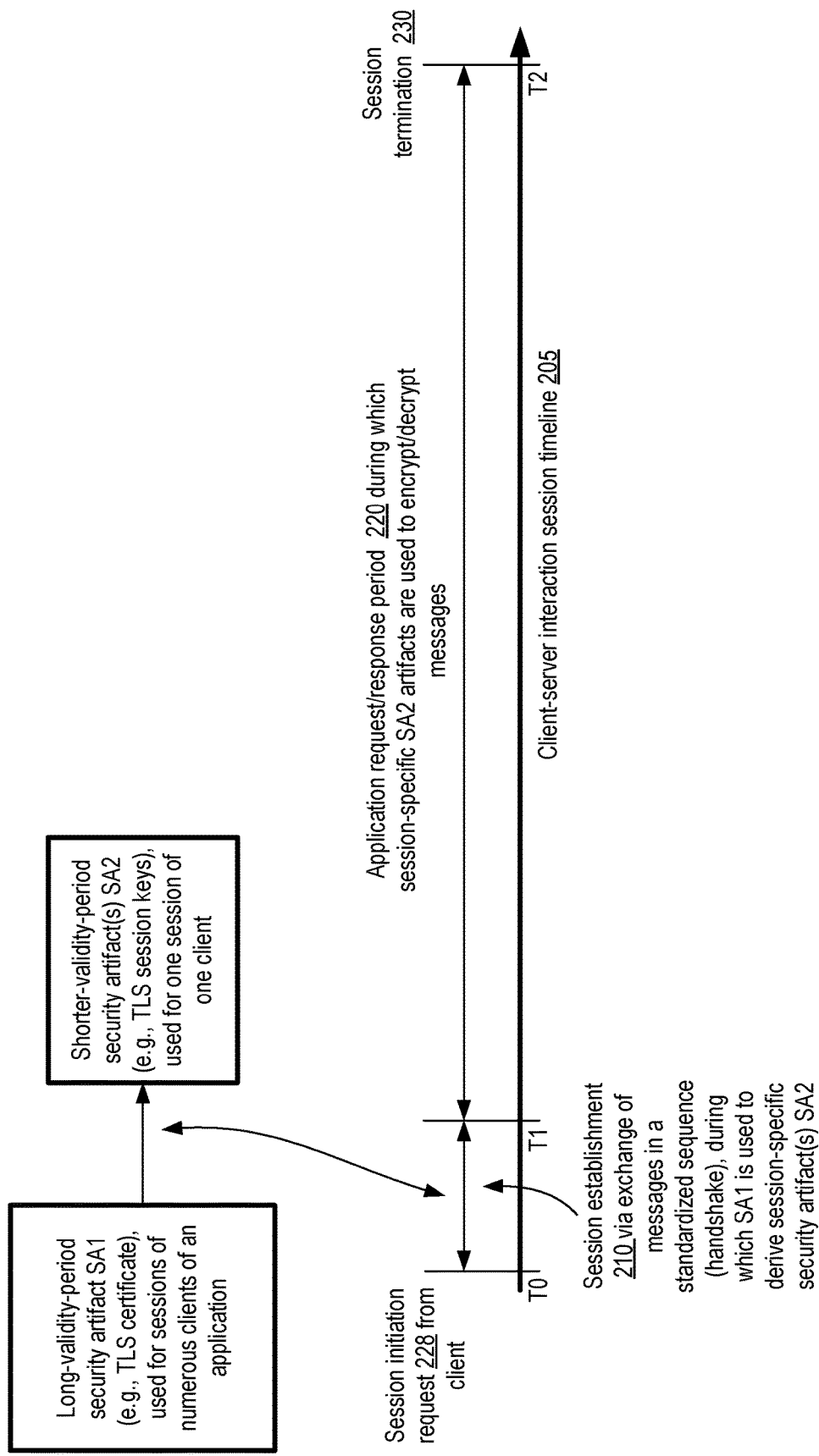
FIG. 2 illustrates an example client-server session timeline during which several types of security artifacts may be employed, according to at least some embodiments.

FIG. 2 illustrates an example client-server session timeline during which several types of security artifacts may be employed, according to at least some embodiments. A session initiation request 228 may be received in accordance with a security protocol from a client of an application at time T0 along timeline 205 in the depicted scenario. The session initiation request (e.g., a TLS "Client Hello" message) may begin a period of session establishment 210, during which a set of messages of the protocol are exchanged in a standardized sequence referred to as a handshake; note that some messages of the sequence may only be transmitted if required in view of earlier messages of the sequence. During the handshake phase, a long-validity-period security artifact SA1 of the application, such as a TLS certificate comprising a private key and a public key associated with the application, may be used to authenticate the application and derive a session-specific shorter-validity-period security artifact SA2 (e.g., a TLS master secret or a TLS session key). SA1 may remain valid for months or years without requiring renewal in some embodiments, and may be used for securing sessions with numerous clients of the application, while SA2 may only be usable for the duration of a single client-server session in at least some embodiments.

At time T1 along timeline 205, the handshake may conclude, and SA1 may not be required for the remainder of the client-server session which includes application request/response period 220. In contrast, SA2 may be used, for example, directly or via the generation of additional intermediate artifacts, to encrypt/decrypt messages between the client and the server for as long as the session lasts. Session termination 230 may occur at time T2 of timeline 205, after which SA2 may no longer be usable. SA1 may of course be used multiple times, e.g., for each of hundreds or thousands of client-server sessions, in each of which a different session-specific set of artifacts may be generated during handshake processing.

Figure 3:
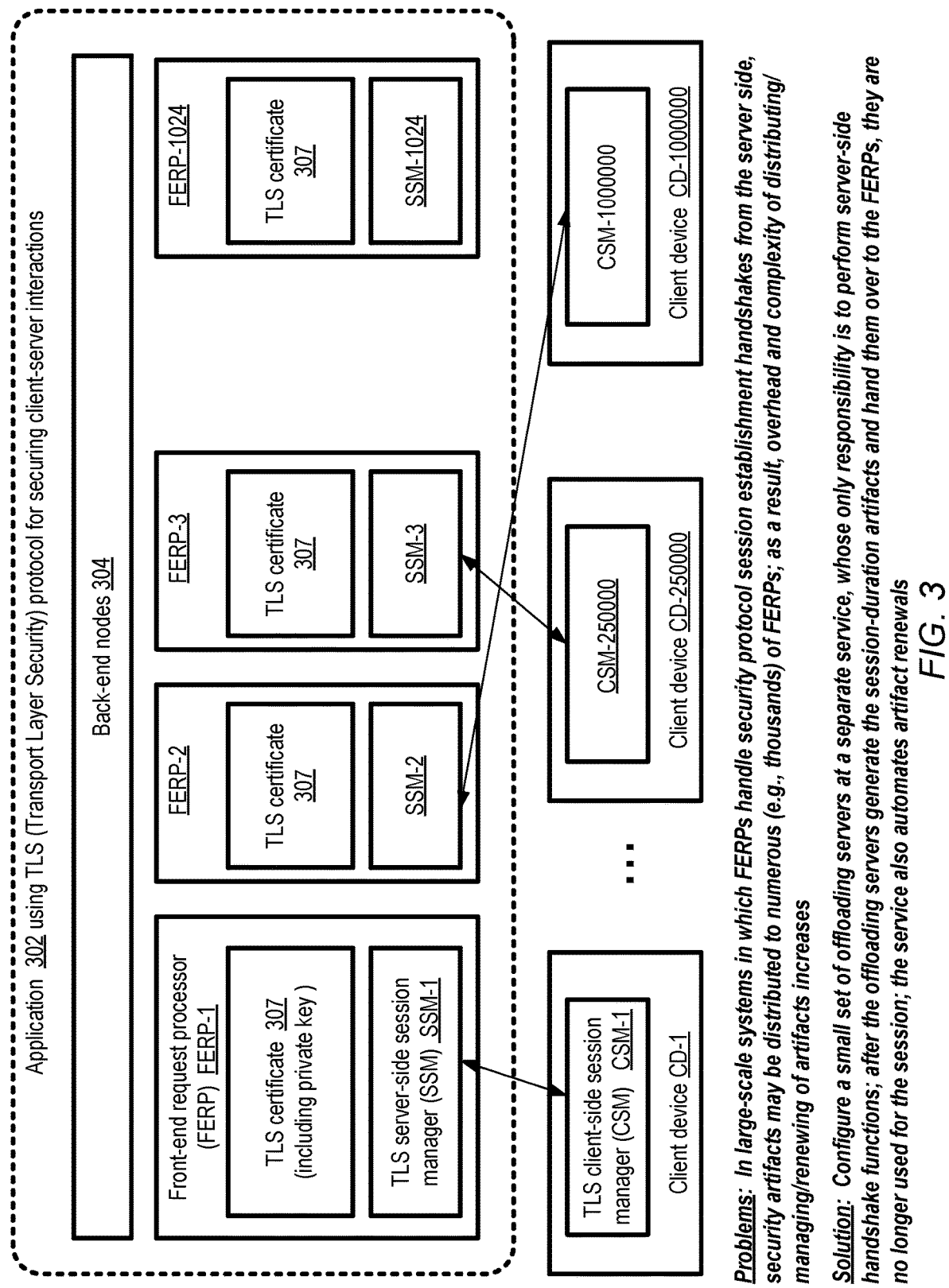
FIG. 3 illustrates an example scenario in which a security artifact used for authenticating the servers implementing an application is stored at each of numerous front-end request processors of the application, according to at least some embodiments.

Because front-end request processors (FERPs) such as web servers or load balancers receive client-submitted message on behalf of an application, the FERPs are often used to perform the server-side operations of security protocol handshakes, and also to perform encryption/decryption for subsequent client-server interactions. For some large-scale applications or services, hundreds or thousands of such FERPs may be configured in conventional approaches. FIG. 3 illustrates an example scenario in which a security artifact used for authenticating the servers implementing an application is stored at each of numerous front-end request processors of the application, according to at least some embodiments.

In the example scenario depicted in FIG. 3, a large-scale application 302 which utilizes TLS for securing client-server interactions from numerous clients includes a set of back-end nodes 304 and 1024 FERPs (FERP-1 through FERP-1024). Application 302 may utilize a single TLS certificate 307, configured (for example) for a domain name used by the application. The TLS certificate 307 may be replicated at each of the 1024 FERPs in the scenario shown in FIG. 3, as any of the 1024 FERPs could be selected to respond to a TLS session initiation request from a client. Each FERP may include a respective TLS server-side session manager (SSM), such as SSM-1 through SSM-1024, which collectively process messages received from at least a million client devices (CDs), CD-1 through CD-1000000. TLS client-side session managers (CSMs) such as CSM-1 running at a client device CD-1, CSM-25000 running at CD-250000, and CSM-1000000 running at CD-1000000, generate the initial handshake messages for respective sessions and transmit them to the FERPs. In general, any given FERP may receive messages from any given CD in the example scenario shown in FIG. 3.

In large-scale systems such as that shown in FIG. 3, the administrative overhead and complexity of distributing, managing and renewing the artifacts increases as the number of FERPs increases. In order to avoid such problems, in various embodiments a small set of offloading servers may be configured at a separate service (e.g., a service similar in features and functionality to SPHOS 122 of FIG. 1). The primary or sole responsibility of the offloading servers or offloaders is to perform server-side handshake functions. After the offloading servers generate session-specific or session-duration artifacts during the handshakes and hand them over to the FERPs, the offloading servers are no longer used for the sessions. The service can also automate artifact renewals if desired.

Figure 4:
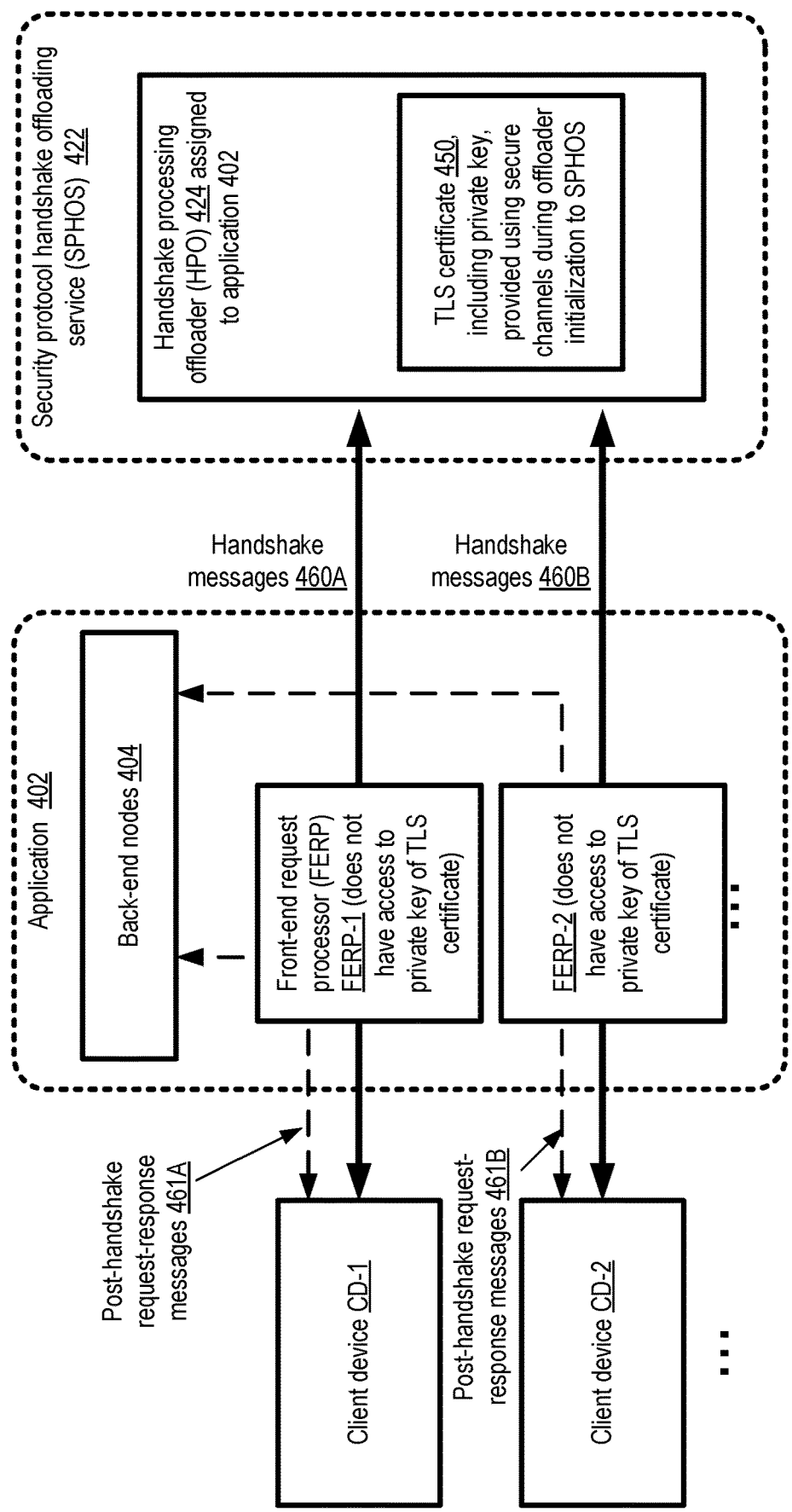
FIG. 4 illustrates a high-level overview of the message flow during client-server interaction sessions of an application which utilizes a security protocol handshake offloading service, according to at least some embodiments.

FIG. 4 illustrates a high-level overview of the message flow during client-server interaction sessions of an application which utilizes a security protocol handshake offloading service, according to at least some embodiments. Application 402 may comprise back-end nodes 404 and a set of front-end request processors including FERP-1 and FERP-2. A handshake processing offloader (HPO) 424 of an SPHOS 422 may be assigned to application 402, e.g., in response to one or more programmatic requests directed to the control plane of the SPHOS 422. Access to a TLS certificate 450 of application 402 is provided to HPO 424, but the FERPs of the application are not granted access to at least the private key of TLS certificate 450.

Handshake messages 460A and 460B originating at client devices CD-1 and CD-2 may be passed on to the HPO 424 via FERP-1 and FERP-2, and corresponding responses generated at the HPO may be passed back to the client devices via the FERPs in the depicted embodiment. After session-specific security artifacts needed for the remainder of each client-server interaction session are generated on the server-side at the HPO during the handshake procedure, the session-specific security artifacts are transmitted from the HPO to the FERPs, and the HPO plays no further part in the sessions. Corresponding client-side session-specific security artifacts may also be generated at the client devices for each session during client-side handshake operations. Post-handshake request-response messages 461A of the session established with client device CD-1 may be encrypted/decrypted using the session-specific artifacts of that session, and post-handshake request-response messages 461B of a second session established with client device CD-2 may be encrypted/decrypted using the session-specific artifacts of that second session.

Figure 5:
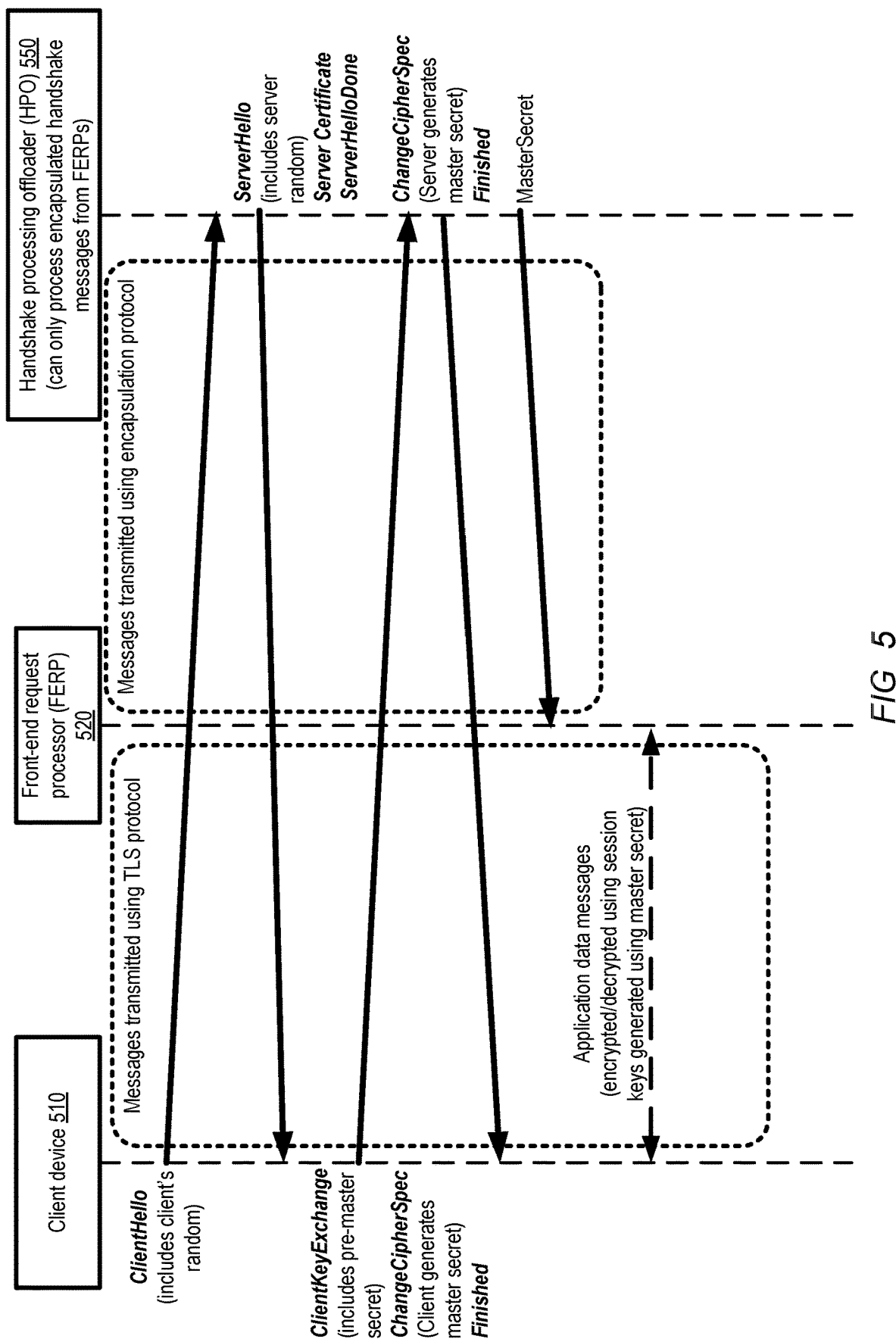
FIG. 5 illustrates an example sequence of messages between a client device, a front-end request processor, and a security protocol handshake processing offloader, according to at least some embodiments.

Depending on the specific security protocol being used, different types of messages may be exchanged during the handshake procedure between client devices and the server-side components of the applications. FIG. 5 illustrates an example sequence of messages between a client device, a front-end request processor, and a security protocol handshake processing offloader, according to at least some embodiments. In the example scenario depicted in FIG. 5, a security protocol similar or identical to TLS version 1.2 may be employed, and an FERP 520 may act as an intermediary between a client device 510 and an HPO 550. With respect to messages received from an FERP such as FERP 520, the HPO 550 may only process encapsulated handshake messages of the protocol; that is, if the FERP attempts to transmit some other type of message, the HPO may reject or drop the message in the depicted embodiment. Messages between the client device and the FERP of the application may be transmitted using the TLS protocol in the depicted embodiment; in contrast, messages between the FERP and the HPO may be transmitted using an encapsulation protocol (e.g., an application layer protocol in which each client-side message is encapsulated or contained within the data payload of a packet). In at least some embodiments, the SPHOS may provide plug-ins or other software programs that can be installed and run at the FERP, enabling the FERP to communicate with an HPO during handshakes and not attempt to find security artifacts such as TLS certificate private keys on local storage of the FERPs.

From client device 510, a Client Hello message may be sent using the security protocol to the FERP 520 to initiate the handshake procedure in the depicted embodiment. In some embodiments, the Client Hello message may include at least some of the following kinds of information: a list of protocol versions that the client device supports, a pseudo-random number referred to as a client random, an optional session identifier to be used for the session, an indication of a compression method to be used for the session's data messages, an indication of one or more cipher suites the client is willing to utilize, and/or an indication of extensions representing additional functionality desired by the client. A cipher suite may indicate a combination of cryptographic algorithms proposed for use for the session, e.g., one algorithm each for key exchange, authentication, bulk data encryption, and message authentication. A cipher suite may typically be indicated by providing a long string whose sub-strings indicate the algorithms. For example, the cipher suite string TLS_ECDHE_ECDSA_WITH_AES_128_GCM_SHA256 may indicate that the security protocol being used is TLS, the elliptic curve Diffie-Helman algorithm (ECDHE) is to be used for key exchange, the elliptic curve digital signature algorithm (ECDSA) is to be used for authentication, the Advanced Encryption Standard 128 bit Galois/Counter Mode algorithm (AES_128_GCM) is the data encryption algorithm, and the Secure Hash Algorithm 256 bit (SHA256) is to be used as the message authentication code (MAC) algorithm. Extensions representing additional functionality may include, for example, supported groups or point formats for elliptic curve cryptography, additional signature-related algorithms and the like. If the server side cannot provide the additional functionality, the client side may abandon the handshake and hence the session in some embodiments.

Upon receiving a Client Hello TLS message of the handshake, the FERP 520 may send an encapsulated version of at least a portion of the Client Hello message to the HPO. The contents of the Client Hello message may be analyzed by the HPO as part of server-side handshake operations of TLS, and a corresponding Server Hello message followed by a Server Certificate and a Server Hello Done message may be transmitted to the client device 510 via the FERP 520. The Server Hello message may, for example, include one or more of the following: an indication of the TLS version (from among the TLS versions listed in the Client Hello) that the server side of the application has chosen to use, a pseudo-random number (referred to as a server random), a session identifier, a selected cipher suite from among the cipher suites proposed by the client, and a selected compression method from among the methods proposed by the client. The Server Certificate may be signed using an algorithm indicated in the Server Hello message, and may be used to prove the server side's identity. The public key of the TLS certificate of the application may also be included in the Server Certificate message in at least some embodiments. In one embodiment, the TLS certificate may be included in or appended to the Server Hello message. Depending on the algorithms indicated in the cipher suite, additional messages may be exchanged at this stage, before the Server Hello Done message is sent to indicate the transmission of server-side information in response to the Client Hello has ended, in some embodiments. The messages generated at the HPO in response to the Client Hello may be sent to the FERP using the encapsulation protocol; at the FERP, their contents may be extracted from the encapsulation messages and TLS may be used to send the contents to the client device.

In at least some embodiments, the next client-initiated message may comprise a Client Key Exchange message which includes a security artifact referred to as a "pre-master secret". The pre-master secret may be created at the client (the method of creating may vary with the cipher suite) before it is shared with the server side. The public key extracted from the server certificate received at the client device may be used to encrypt the pre-master secret in some embodiments. After the HPO receives the pre-master secret via the FREP, the pre-master secret may be decrypted using the certificate's private key (which is not accessible from the FREP itself) in the depicted embodiment. At this stage, both sides participating in the handshake (the client device and the HPO) have access to the pre-master secret, the client random and the server random, but the FREP does not have access to the (decrypted) pre-master secret. Using the pre-master secret, the client random and the server random, in at least some embodiments a session-specific security artifact referred to as a TLS master secret may be computed by the HPO and also by the client. Change Cipher Spec messages may be exchanged in both directions to indicate that further messages of the session will be encrypted using keys derived from the master secret in some embodiments. Finished messages may be sent to indicate that the handshake is complete. The master secret generated by the HPO may be sent to the FERP 520 in the depicted embodiment, and the HPO may end its operations for the session. Application data messages (such as request/response messages) may be encrypted and decrypted at the client device and the FERP using session-specific symmetric cryptographic keys derived using the master secret in the depicted embodiment. As indicated above, the TLS certificate's private key, accessible to the HPO but not to the FERP, may be used (e.g., for decrypting the pre-master secret) along with the contents of client-initiated handshake messages (e.g., the client random) to generate the session-specific artifacts (the master secret and the session-level data encryption keys) used for the remainder of the session in the depicted embodiment. Other sets of handshake messages than those shown in FIG. 5 may be used for protocols other than TLS in various embodiments.

FIG. 6 illustrates example implementation options of a handshake offloading solution, according to at least some embodiments. In some embodiments, several of the implementation options 601 shown in FIG. 6 may be used in combination. In at least some embodiments, login and shell-based access to the offloaders may be prohibited, as indicated in element 610. Implementation options 601 may include storing encrypted versions of the security artifacts at rest 620 in various embodiments. During the configuration or establishment of HPOs, data encryption keys (DEKs) obtained from a key management service may be used to encrypt the private keys being transmitted to the data plane servers comprising the HPOs (element 630) in at least some embodiments, and the DEKs may be rotated or replaced frequently.

In some embodiments, a given HPO may comprise one or more processes or threads of execution run within a virtual machine or compute instance. Stripped-down or minimized machine images may be used to launch the compute instances, as indicated in element 640. To create the minimized machine images, components of operating systems that are not required for handshake message processing may be removed. In at least one embodiment, the HPO process(es) or thread(s) may be run in a restricted or constrained execution environment (element 650) or execution mode, such as by using the equivalent of the "chroot" feature on Linux operating systems. Any given HPO process run using such constraints may be unable to access resources (such as directories or files) of the data plane server being used, except for a limited set specifically meant for that HPO process. Each of several HPO processes may in effect be restricted to accessing data within its own root directory, which is distinct from the root directories of the other HPO processes in scenarios in which chroot is used.

Special dedicated networking hardware links and networking devices (e.g., switches, routers etc.) may be used for the communications between FERPs and HPOs in some embodiments (element 660). Such links and devices may not be shared with any other service or application. In some embodiments, a pre-created connection pool may be used for communications between the FERPs of an application and the HPOs assigned to that application. As mentioned earlier, in at least some embodiments, an encapsulation protocol (which may itself use a security protocol similar to TLS) may be used for messages transmitted between the FERPs and the HPOs (element 670). Messages other than handshake messages may be rejected by the HPOs in various embodiments. Note that some of the options shown in FIG. 6 may not be required if others are used—for example, in one embodiment in which physically secure dedicated network links are used for communication between an FERP and an HPO, an encapsulation protocol may not be used (although both features could also be used together if desired). Other implementation options than those shown in FIG. 6 may be employed in some embodiments, and one or more of the options shown in FIG. 6 may not necessarily be employed in a given embodiment.

Figure 7:
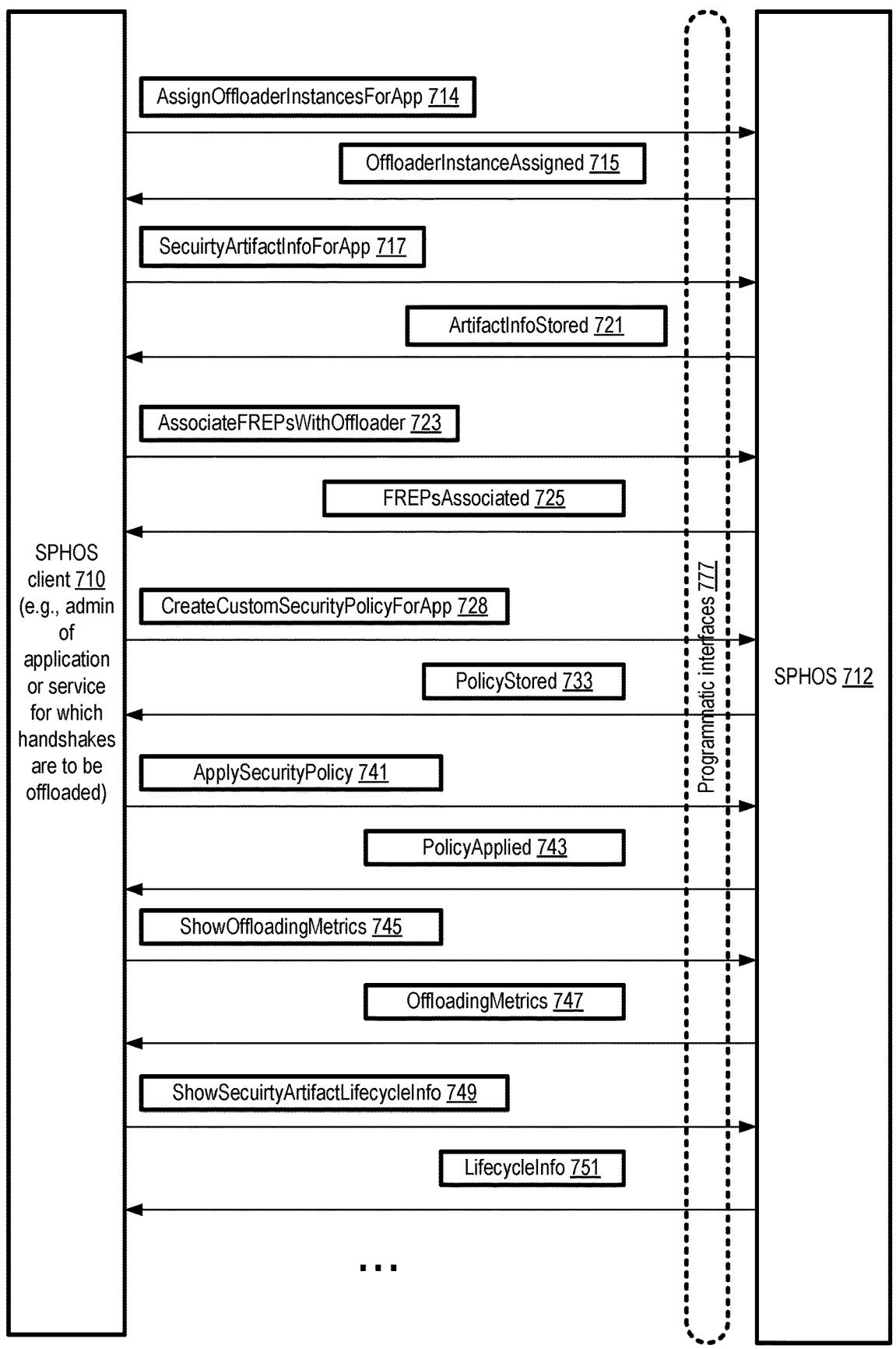
FIG. 7 illustrates example programmatic interactions associated with the configuration and use of security protocol handshake offloaders, according to at least some embodiments.

FIG. 7 illustrates example programmatic interactions associated with the configuration and use of security protocol handshake offloaders, according to at least some embodiments. In the embodiment depicted in FIG. 7, an SPHOS 712, similar in features and functionality to SPHOS 122 of FIG. 1, may implement a set of programmatic interfaces 777 to be used for configuration-related messages from SPHOS clients 710, such as administrators of the applications/services whose server-side handshake operations are to be offloaded. The programmatic interfaces 777 may include, among others, web-based consoles, command-line tools, graphical user interfaces, and/or application programming interfaces (APIs) in different embodiments.

Using the programmatic interfaces 777, a client 710 may submit an AssignOffloaderInstancesForApp request 714, requesting that the SPHOS select one or more HPOs for use by a specified application. In response, metadata indicating the association of one or more HPOs with the specified application may be generated and stored at the SPHOS control plane, and an OffloaderInstancesAssigned message 715 may be sent to the client un some embodiments. The AssignOffloaderInstancesForApp request may in some cases include a tenancy parameter indicating whether the client 710 wishes to have the HPOs configured in multi-tenant mode or single-tenant mode. If a tenancy parameter is not specified, a default tenancy mode such as multi-tenant mode may be chosen by the SPHOS in one embodiment. If multi-tenant mode is to be used, in at least some embodiments the SPHOS 712 may assign a pre-existing HPO to the client's application, e.g., instead of launching a new HPO process. In some embodiments, the AssignOffloaderInstancesForApp may specify the number of HPOs to be assigned for performance (e.g., to handle high volumes of client-server interaction sessions) and/or availability (e.g., including whether HPOs in multiple availability zones are to be assigned).

A client 710 may submit a Security ArtifactInfoForApp message 717 to the SPHOS in some embodiments, indicating a source (e.g., a certificate management service) from which the security artifact(s) used at the HPOs during the handshakes can be obtained. The information about the source, such as a unique certificate identifier generated at a certificate management service and any additional information required to obtain the artifacts from the source that is included in the message 717, may be stored at the SPHOS 712 and an ArtifactInfoStored message 721 may be sent to the client in some embodiments. The client may not need to access the TLS certificate itself to provide the information included in the Security ArtifactInforForApp in at least some embodiments. In at least one implementation, if desired, the client may include an encrypted representation of the security artifact(s) in the Security ArtifactInfoForApp message itself.

In some embodiments, a client may wish to use different HPO instances for respective subsets of the FREPs of their application. An AssociateFREPsWithOffloader request 723 may be submitted by the client to indicate which specific FREPs should be associated or linked with a given HPO in the depicted embodiment. Instead of listing FREPs, in some embodiments a role/capability defined at an identity management service may be used to grant FREPs access to an HPO—e.g., an AssociateFREPsWithOffloader request may indicate that any FREP which is assigned a role R1 is to be allowed to communicate with a specified RP. Metadata linking the HPO with the FREPs may be stored at the SPHOS control plane, and an FREPsAssociated message 725 may be sent to the client in at least one embodiment.

A CreateCustom Security PolicyForApp request 728 may be sent to the SPHOS by a client, indicating various details of a new security policy which specifies a set of acceptable algorithms for authentication, data encryption, message authentication, compression, protocol extensions, and the like for at least some client-server interactions of an application. The policy may be stored at the SPHOS control plane, and a Policy Stored message 733 may be sent to the client. A separate ApplySecurityPolicy request 741 may be submitted in one embodiment indicating rules for determining the granularity or scope at which a policy is to be applied—e.g., whether the policy applies to all interactions for which a given TLS certificate is used during handshakes, to all interactions associated with a given domain name or a given SNI (Server Name Indication), to all clients whose network addresses lie within a specified range, to all clients whose requests are received from a specified geographical region or location, etc. The policy may be applied based on the rules indicated in the ApplySecurityPolicy message, and a Policy Applied message 743 may be sent to the client in the depicted embodiment. In other embodiments applicability rules may be included in the CreateCustomSecurityPolicyForApp request 728, and a separate ApplySecurityPolicy message may not be used.

A client 710 may request metrics collected with respect to handshake offloading for one or more of the client's applications or services in some embodiments. A ShowOffloadingMetrics request 745 may be submitted to obtain the metrics, and the requested metrics may be provided from the SPHOS via one or more OffloadingMetrics messages 747. Such metrics may include, for example, the number of handshakes processed at an HPO during a time interval, the number of times non-default security policies are applied for a client-server session, the relative frequencies of use of different security algorithms based on the policies, the number of artifact renewals/rotations which are performed per unit time, and so on.

As indicated earlier, in at least some embodiments artifacts such as TLS certificates may be renewed automatically on behalf of clients by the SPHOS. A client who wishes to obtain information about impending expirations of artifacts being managed using the SPHOS (as well as other data pertaining to artifact lifecycles such as when a certificate was created/acquired) may submit a ShowSecurity ArtifactLifecycleInfo request 749 to the SPHOS in the depicted embodiment. Information about the artifacts associated with the client's applications may be provided via one or more LifecycleInfo messages 751. In some embodiments, programmatic interactions other than those shown in FIG. 7 may be supported by an SPHOS 712.

Figure 8:
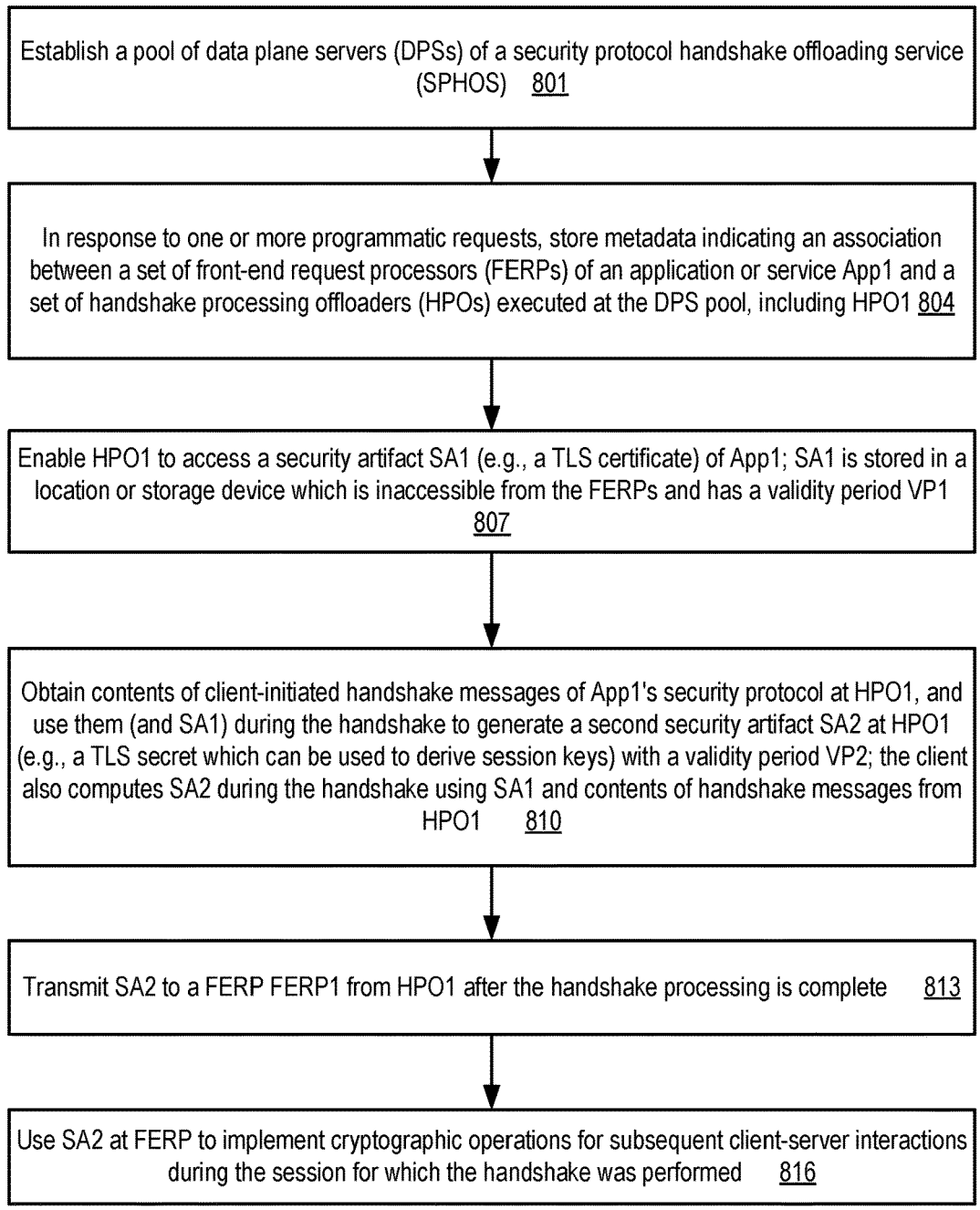
FIG. 8 is a flow diagram illustrating aspects of operations which may be performed to configure and use a security protocol handshake offloading service, according to at least some embodiments.

FIG. 8 is a flow diagram illustrating aspects of operations which may be performed to configure and use a security protocol handshake offloading service, according to at least some embodiments. As shown in element 801, a pool of data plane servers of an SPHOS similar in functionality to SPHOS 122 of FIG. 1 may be established and/or acquired in the depicted embodiment. In response to one or more programmatic requests received via control plane interfaces of the SPHOS, metadata indicating an association between a set of front-end request processors (FERPs) of an application or service App1 and a set of handshake processing offloaders (HPOs) executed at servers of the data plane may be stored. The set of FERPs may include HPO1, running at a particular data plane server selected by the control plane of the SPHOS for App1 (element 804).

HPO1 may be granted access to a security artifact SA1 (e.g., a TLS certificate) of App1, which is stored at a storage location or device that is inaccessible from the FERPs of App1 and has a validity period VP1 (element 807). Contents of various handshake messages of the security protocol used for App1, which are sent from a client device of App1, may be obtained at HPO1 (e.g., after they are forwarded from an FERP) (element 810). Using contents of the handshake messages (e.g., client-provided random numbers) as well as SA1, a second security artifact SA2 with a different validity period VP2 may be generated during the handshake procedure at HPO1 in various embodiments. Similarly, using contents of handshake response messages sent from HPO1 (e.g., server-side random numbers), the security artifact SA2 may also be generated at the client device during the handshake procedure. SA2 may, for example, comprise a TLS master secret from which encryption keys may be generated for post-handshake messages of the client-server session. The validity period VP2 may be shorter than VP1 in at least some embodiments—e.g., a TLS certificate may remain valid for months or years, while a TLS master secret may only be used within a single client-server session.

After the handshake procedure ends, HPO1 may provide or transmit SA2 to one or more FERPs of App1 in various embodiment (element 813), including an FERP FERP1. At FERP-1, SA2 may be utilized to implement cryptographic operations for subsequent client-server interactions of the session for which the handshake was performed (element 816). In addition to implementing server-side operations of the handshakes, the SPHOS may also provide other functionality such as automated extensions/renewals of the security artifacts, automated scaling up or scaling down of the fleet of data plane servers and/or HPOs assigned to App1 based on analysis of resource usage metrics, and the like in at least some embodiments. It is noted that in various embodiments, some of the operations shown in the flow diagram of FIG. 8 may be implemented in a different order than that shown in the figure, or may be performed in parallel rather than sequentially. Additionally, some of the operations shown in FIG. 8 may not be required in one or more implementations.

Figure 9:
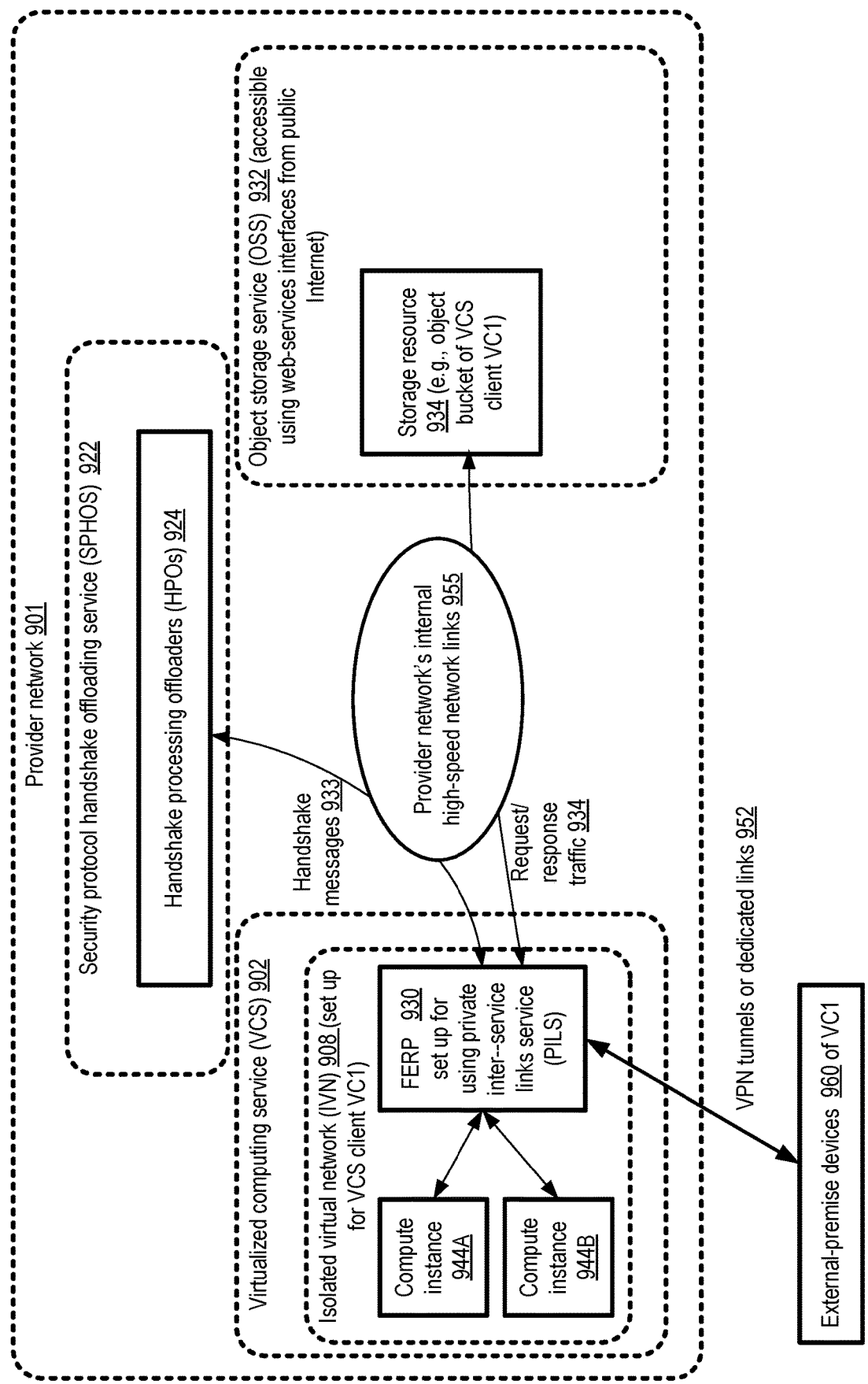
FIG. 9 illustrates an example use of a security protocol handshake offloading service for providing access via a provider network's internal network to a publicly-accessible service of the provider network, according to at least some embodiments.

In some embodiments, as mentioned earlier, an SPHOS may be employed for some of the other services of a provider network, as opposed to applications designed or owned by clients of the provider network. FIG. 9 illustrates an example use of a security protocol handshake offloading service for providing access via a provider network's internal network to a publicly-accessible service of the provider network, according to at least some embodiments. In the embodiment shown in FIG. 9, provider network 901 includes an SPHOS 922, a virtualized computing service (VCS) 902, and an object storage service (OSS) 932. OSS 932 may comprise a number of storage resources, such as object buckets into which unstructured objects can be stored. The storage resources may typically be accessed via public web-services interfaces (e.g., bucket-specific uniform resource locators or URLs) generated at the OSS 932.

At the VCS 902, respective isolated virtual networks (IVNs) may be established for at least some VCS clients. An IVN may comprise a collection of networked resources (including, for example, compute instances) allocated to a given client, which are logically isolated from (and by default, inaccessible from) resources allocated for other clients in other isolated virtual networks. The client on whose behalf an IVN is established may be granted substantial flexibility regarding network configuration for the resources of the IVN—e.g., private IP addresses for compute instances may be selected by the client without having to consider the possibility that other resources within other IVNs may have been assigned the same IP addresses, subnets of the client's choice may be established within the IVN, security rules may be set up by the client for incoming and outgoing traffic with respect to the IVN, and so on. In the scenario depicted in FIG. 9, IVN 908 is established for a client VC1, and includes compute instances 944A and 944B. An IVN may also be referred to as a virtual private cloud or VPC. Storage resource 934 at OSS 932 may have been created on behalf of VC1, and may comprise data that is to be used for computations performed at compute instances of IVN 908. VC1 may wish to enable access to storage resource 934 via the provider network's private high-speed network links 955 from IVN 908, and also from external premise devices 960 (e.g., servers located in an office complex or client-owned data center, external to the data centers of the provider network) in the depicted scenario. Traffic between the external premise and the IVN set up for the client may flow via (for example) VPN (Virtual Private Network) tunnels and/or dedicated physical links (which may be referred to as "Direct Connect" links) 952 in the depicted embodiment. The motivation for using the provider network's private links is that the private links provide a higher level of security, performance, availability and reliability than using the default option of utilizing links of public Internet to access the storage resource.

In order to facilitate the access to resources within services other than the VCS via the provider network's internal network, a private inter-service links service (PILS) may be established by the operator of the provider network. The PILS may in effect represent a higher-level service which provides access via internal endpoints and links to destination services such as the OSS. Endpoints (such as virtual network interfaces to which addresses within the private address ranges of IVNs are assigned) may be set up at front-end request processors (FERPs), including FERP 930, of the destination service such as the OSS (or FERPs of the PILS); the back-end nodes may comprise storage resources within the OSS (e.g., storage resource 934) and/or resources within other services of the provider network.

Communications between compute instances 944 (the clients of the destination service) and the back-end nodes (as well as communications between external premise devices 960 and the back-end nodes) may be secured using a protocol similar to TLS in at least some embodiments. In some cases, a separate TLS certificate may be used for each endpoint set up within an IVN using the PILS, so the total number of TLS certificates in use for a given destination service such as the OSS may run into the tens of thousands. Artifacts used during the handshake procedure of client-server interactions of the destination service, such as TLS certificates of the OSS, may be made accessible to one or more HPOs 924 of the SPHOS 922 in the depicted embodiment. The server-side handshake operations of the security protocol used by the destination service may be performed at the HPOs (e.g., including processing contents of, and responding to, handshake messages 933), and session-level artifacts generated at the HPOs during the handshake may be transmitted to the FERPs for use during the remainder of the client-server sessions as discussed earlier.

Figure 10:
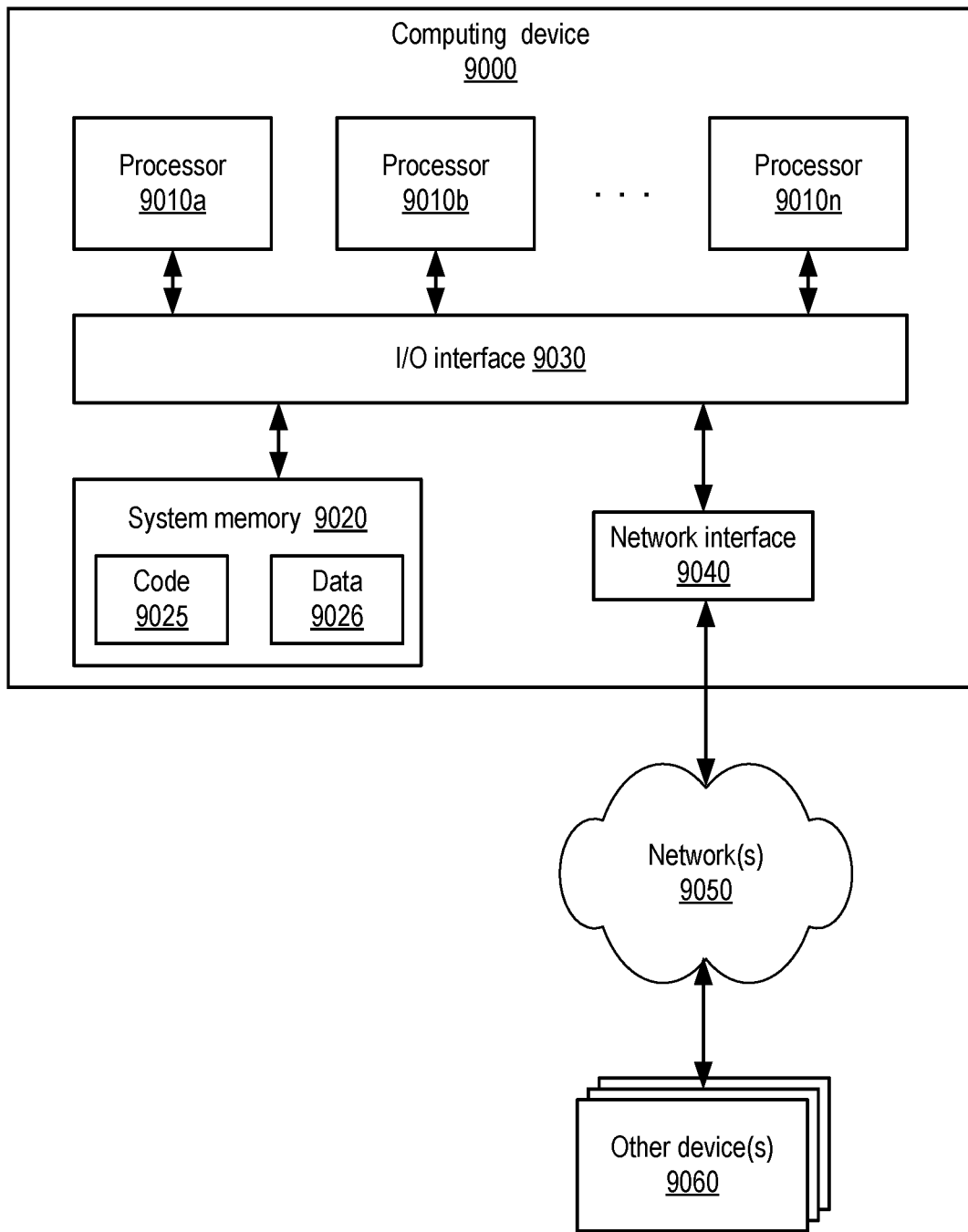
FIG. 10 is a block diagram illustrating an example computing device that may be used in at least some embodiments.

In at least some embodiments, a server that implements the types of techniques described herein (e.g., various functions of an SPHOS, a VCS and other services of a provider network), may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferro-electric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 9. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   a first processor and a first memory storing first program instructions that when executed by the first processor implement a control plane server of a security protocol offloading service;
   a second processor and a second memory storing second program instructions that when executed by the second processor implement a data plane server of the security offloading service, wherein the data plane server is configured to implement a handshake processing offloader; and
   a third processor and a third memory storing third program instructions that when executed by the third processor implement a front-end request processor of an application;
   wherein the control plane server is configured to, in response to one or more programmatic requests, (a) store an indication that the front-end request processor is permitted to communicate with the handshake processing offloader, and (b) cause a first security artifact associated with the application to be stored at a location which is inaccessible from the front-end request processor;
   wherein the handshake processing offloader is configured to:
      obtain at least a portion of contents of a set of client-initiated handshake messages of a security protocol utilized for client-server interactions of the application; and
      generate a second security artifact using (a) the portion of contents of the set of client-initiated handshake messages and (b) the first security artifact, wherein a validity period of the second security artifact is shorter than a validity period of the first security artifact; and
      cause the second security artifact to be obtained at the front-end request processor; and
   wherein the front-end request processor is configured to utilize the second security artifact to perform, during the validity period of the second security artifact, a cryptographic operation with respect to a client-server interaction of the application.

2. The system as recited in claim 1, wherein the security protocol is a version of Transport Layer Security (TLS), and wherein the first security artifact comprises a private key of a cryptographic key pair of a TLS server certificate of the application.

3. The system as recited in claim 1, wherein the control plane server is further configured to:
   obtain, via a programmatic interface, an indication of a policy associated with the application and the security protocol, wherein the policy indicates one or more of: (a) an acceptable key exchange algorithm, (b) an acceptable authentication algorithm, (c) an acceptable data encryption algorithm, (d) an acceptable message authentication code algorithm, or (e) an acceptable compression algorithm, wherein the handshake processing offloader verifies that the set of client-initiated handshake messages are in compliance with the policy.

4. The system as recited in claim 1, wherein the front-end request processor is further configured to:
   receive a client-initiated handshake message of the set of client-initiated handshake messages of the security protocol; and
   forward at least a portion of contents of the client-initiated handshake message to the handshake processing offloader.

5. The system as recited in claim 1, wherein the front-end request processor is further configured to:
   receive a client-initiated handshake message of the set of client-initiated handshake messages of the security protocol; and transmit at least a portion of contents of the client-initiated handshake message to the handshake processing offloader using a protocol which differs from the security protocol.

6. A computer-implemented method, comprising:

in response to one or more programmatic requests directed to a network-accessible service, (a) storing metadata indicating that a handshake processing offloader of a security protocol utilized for client-server interactions of an application has been configured, and (b) causing a first security artifact associated with the application to be stored at a location inaccessible from a front-end request processor of the application;

obtaining at least a portion of contents of a set of client-initiated handshake messages of the security protocol at the handshake processing offloader, wherein the set of client-initiated handshake messages is associated with the application;

generating, by the handshake processing offloader in accordance with the security protocol, a second security artifact using (a) the portion of contents of the set of client-initiated handshake messages and (b) the first security artifact;

causing the second security artifact to be obtained at the front-end request processor; and utilizing, by the front-end request processor, the second security artifact to perform at least a cryptographic operation with respect to a client-server interaction of the application.

7. The computer-implemented method as recited in claim 6, further comprising:

obtaining, at the network-accessible service, via a programmatic interface, an indication of a policy associated with the application and the security protocol, wherein the policy indicates one or more of: (a) an acceptable key exchange algorithm, (b) an acceptable authentication algorithm, (c) an acceptable data encryption algorithm, (d) an acceptable message authentication code algorithm, or (e) an acceptable compression algorithm; and verifying, by the handshake processing offloader, that the policy is not violated by the set of client-initiated handshake messages.

8. The computer-implemented method as recited in claim 7, further comprising:

obtaining, at the network-accessible service, via the programmatic interface, an indication of an applicability rule of the policy, wherein the applicability rule is a member of a set comprising one or more of: (a) a rule associated with the first security artifact, (b) a rule associated with a set of client addresses, (c) a rule associated with a client location, or (d) a rule associated with one or more domain names, wherein verifying that the policy is not violated comprises applying the policy in accordance with the applicability rule.

9. The computer-implemented method as recited in claim 6, wherein the first security artifact has an associated validity period, the computer-implemented method further comprising:

automatically causing, by the network-accessible service, the associated validity period to be extended, without obtaining a request for extending the associated validity period.

10. The computer-implemented method as recited in claim 6, further comprising:

storing, at the network-accessible service in response to the one or more programmatic requests, an indication that the handshake processing offloader is configured in multi-tenant mode; and causing contents of client-initiated handshake messages associated with another application to be obtained and processed at the handshake processing offloader.

11. The computer-implemented method as recited in claim 6, further comprising:

receiving the set of client-initiated handshake messages of the security protocol at the front-end request processor in an un-encrypted form from a client device; and encrypting the portion of contents of the set of client-initiated handshake messages at the front-end request processor prior to transmitting the portion of contents to the handshake processing offloader.

12. The computer-implemented method as recited in claim 6, further comprising:

receiving the set of client-initiated handshake messages of the security protocol at the front-end request processor; and transmitting the portion of contents of the set of client-initiated handshake messages to the handshake processing offloader via a dedicated hardware network channel.

13. The computer-implemented method as recited in claim 6, wherein the handshake processing offloader comprises a virtual machine, the computer-implemented method further comprising:

launching the virtual machine using a customized machine image from which one or more subcomponents of an operating system which are not required for handshake processing operations have been removed.

14. The computer-implemented method as recited in claim 6, wherein the handshake processing offloader comprises a process run in a particular isolation mode, wherein in accordance with the particular isolation mode, the process is not permitted to access a resource which is accessible from another handshake processing offloader of the network-accessible service.

15. The computer-implemented method as recited in claim 6, further comprising:

configuring, by the network-accessible service, a first handshake processing offloader within a first availability zone of a cloud computing environment, and a second handshake processing offloader within a second availability zone of the cloud computing environment; and causing, in response to a triggering condition, one or more handshake processing operations to be failed over from the first handshake processing offloader to the second handshake processing offloader.

16. A non-transitory computer-accessible storage medium storing program instructions that when executed on a processor:

obtain at least a portion of contents of a set of client-initiated handshake messages of a security protocol at a handshake processing offloader configured for an application, wherein the application utilizes a front-end request processor, and wherein the handshake processing offloader was configured in response to obtaining one or more programmatic requests directed to a network-accessible service causing metadata to be stored indicating that the handshake processing offloader of the security protocol is utilized for client-server interactions of the application has been configured, and causing a first security artifact associated with the application to be stored at a location inaccessible from a front-end request processor of the application;

generate, by the handshake processing offloader, a second security artifact using (a) the portion of contents of the set of client-initiated handshake messages and (b) the first security artifact; and transmit, from the handshake processing offloader, the second security artifact to the front-end request processor, wherein the front-end request processor utilizes the second security artifact to perform a cryptographic operation with respect to a client-server interaction of the application.

17. The computer-accessible storage medium as recited in claim 16, storing further program instructions that when executed on the processor:

enforce, by the handshake processing offloader, at least a portion of a policy associated with the application and the security protocol, wherein the policy is specified by an administrator of the application via a programmatic interface, and wherein the policy indicates one or more of: (a) an acceptable key exchange algorithm, (b) an acceptable authentication algorithm, (c) an acceptable data encryption algorithm, (d) an acceptable message authentication code algorithm, or (e) an acceptable compression algorithm.

18. The non-transitory computer-accessible storage medium as recited in claim 16, wherein the front-end request processor comprises one or more of: (a) a web server or (b) a load balancer.

19. The non-transitory computer-accessible storage medium as recited in claim 16, storing further program instructions that when executed on the processor:

provide, via one or more programmatic interfaces of an offloading service at which the handshake processing offloader is implemented, a metric collected at the handshake processing offloader, wherein the metric indicates at least a number of handshakes processed during a time interval.

20. The non-transitory computer-accessible storage medium as recited in claim 16, storing further program instructions that when executed on the processor:

obtain, by the handshake processing offloader, an encrypted version of the first security artifact from a storage device; and decrypt, at the handshake processing offloader, the encrypted version prior to generating the second security artifact.

* * * * *